United States Patent
Martin et al.

(10) Patent No.: US 9,336,518 B1
(45) Date of Patent: May 10, 2016

(54) METHOD AND SYSTEM FOR CONDITIONING GRANT OF DIGITAL RIGHTS ON RECEIVING AND VALIDATING CONTENT-DISTRIBUTION REFERRALS

(75) Inventors: Geoff S. Martin, Overland Park, KS (US); Jonathan R. Kindred, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2634 days.

(21) Appl. No.: 11/387,476

(22) Filed: Mar. 23, 2006

(51) Int. Cl.
*G06Q 20/00* (2012.01)
*G06Q 20/12* (2012.01)
*G06Q 30/02* (2012.01)

(52) U.S. Cl.
CPC ........ *G06Q 20/1235* (2013.01); *G06Q 30/0214* (2013.01)

(58) Field of Classification Search
CPC ....... G06Q 20/00–20/425; G06Q 30/00–30/08
See application file for complete search history.

(56) References Cited

U.S. PATENT DOCUMENTS

| | | | |
|---|---|---|---|
| 6,453,305 B1* | 9/2002 | Glassman et al. | 705/59 |
| 2004/0153365 A1* | 8/2004 | Schneider et al. | 705/14 |
| 2007/0207780 A1* | 9/2007 | McLean | 455/414.1 |
| 2007/0220103 A1* | 9/2007 | Rogers et al. | 709/217 |

* cited by examiner

*Primary Examiner* — Mohammad A Nilforoush

(57) ABSTRACT

A method and system for conditioning grant of digital rights on receiving and validating content-distribution referrals is provided. A subscriber using a communication device may enter a request to use locked digital content, or request a content-use right. The user may be prompted to enter one or more referrals as potential other recipients of the content. An indication of the one or more referrals may be sent to a network entity, which may determine whether at least a threshold number of the entered referrals are valid. If so, a network entity may transmit to the communication device data that will facilitate use of the digital content. Additionally, a network entity may send a solicitation message to each of at least the threshold number of entered referrals. A network entity may also provide an award in return for the entered referrals.

6 Claims, 7 Drawing Sheets

METHOD AND SYSTEM FOR CONDITIONING GRANT OF DIGITAL RIGHTS ON RECEIVING AND VALIDATING CONTENT-DISTRIBUTION REFERRALS

FIELD OF THE INVENTION

The present invention relates to telecommunications and digital rights management and, more particularly, to distribution of digital content to telecommunications subscribers such as users of cellular wireless devices for instance.

BACKGROUND

The field of digital rights management has grown significantly over recent years. Generally speaking, content authors and distributors wish to protect their rights in digital content, in order to avoid having the content be duplicated and distributed freely without any benefit to them. To protect digital content, the content author or distributor may encrypt the content or otherwise block it from use (e.g., by not providing a critical portion of the content) and may then require the prospective end-user to engage in a process to unlock the content or to otherwise make the content usable. In many cases, the content author or distributor may collect payment from the end-user in return for providing the end-user with an unlock-code (e.g., decryption key) or for otherwise making the content usable by the end-user (e.g., by providing the missing critical portion of the content).

One area where management of digital rights has become particularly important is cellular wireless communications. Traditionally, cellular carriers focused primarily on distributing mobile communication devices such as cell phones and personal digital assistants to their subscribers and providing their subscribers with cellular communication service. With continued advances in technology for playing out and managing media on mobile devices, however, most cellular carriers have begun to additionally focus on distributing premium digital content to their subscribers. In particular, most cellular carriers now provide their subscribers with a convenient mechanism for purchasing, downloading, and/or playing out (or otherwise executing or rendering) on their devices a variety of premium digital content, such as music, video, ringtones, screensavers, user-interface themes, games, and the like.

By way of example, a cellular carrier may operate (or contract with a vendor to operate) an online content store, through which the carrier's subscribers can browse, purchase, and download premium content for playout on their devices. In typical practice, the carrier may provision its subscriber's mobile devices with a link to such a store, so that the subscribers can conveniently browse to the store and purchase and download content to their devices. As a further convenience, the carrier may charge any such purchases to the subscriber's monthly service account, in order to expedite the purchase process, and to thereby improve user-experience and increase revenue to the carrier.

As another example, a carrier may pre-load samples of premium content onto their subscribers devices and may require subscribers to pay (or agree to pay) the carrier in order to fully activate the content if they desire. For instance, a carrier may pre-load a subscriber device with a limited-function version of game and may program the device (e.g., the game) with a feature through which the subscriber can purchase a full-use right. Upon invocation of that feature, the device may communicate with a network server in order to download an unlock-key or other logic and to charge an activation/unlock fee to the subscriber's service account.

As still another example, a carrier may provide advertisements to its subscribers, soliciting the subscribers to purchase premium content. For instance, the carrier may include such advertisements within mailed monthly statements, or the carrier may transmit electronic content advertisements to its subscribers, by e-mail, SMS messaging, MMS messaging, or the like. Depending on their configuration, electronic content advertisements can conveniently allow the recipient subscriber to purchase and download premium content by simply clicking on a purchase-link or the like, thus once again further increasing carrier revenue.

SUMMARY

The present invention provides a mechanism for improved distribution of digital content to subscribers. The invention can be usefully applied with respect to cellular wireless subscribers, and the invention will be described primarily in that context. However, those skilled in the art will appreciate that the concepts described here can be readily extended to facilitate distribution of digital content to other types of subscribers (e.g., to personal computers or other types of devices, and via other sorts of access networks).

As presently contemplated, when a subscriber seeks the right to use particular digital content (e.g., when the subscriber seeks to buy the content or seeks to unlock or render operable the content), a content provider will require, as a condition of granting the right to the subscriber, that the subscriber designate a threshold number of other subscribers as further prospective recipients of the digital content. Moreover, the content provider will require, as part of the condition, that each of the other designated subscribers (of the threshold number) be a legitimate prospective recipient of the content (i.e., the content itself or an unlock-key or the like for the content), in that each designated subscriber must be deemed capable of using the digital content as well.

In practice, the invention can be implemented by a combination of logic programmed on a subscriber device and logic programmed on one or more network servers. For instance, a cellular carrier may provision its subscriber's devices with DRM-control logic that would be executed whenever a subscriber attempts to use locked digital content on the device or when a subscriber specifically seeks to unlock digital content on the device. An exemplary DRM controller would prompt the subscriber to enter into the device at least a threshold number (one or more) other subscriber-IDs (such as mobile directory numbers (MDNs) for instance) as prospective other recipients of the digital content (e.g., of the unlock key for the content). Once the user enters the requested other subscriber-ID(s), the DRM controller may then cause the device to transmit the entered ID(s) to a network server, e.g., via HTTP messaging.

Upon receipt of the entered ID(s), the server will then preferably determine whether each of at least the threshold number of identified subscribers is a legitimate prospective recipient of the content. For instance, the server may dip into one or more databases to determine whether the identified subscriber device is capable of using the digital content. More particularly, the server may determine whether the identified subscriber device has program logic and user-interface components to allow for playout or other use of the content, and the server may further determine whether a version of the content that is compatible with the device's capabilities is available for delivery to the device, and if so (on both counts), may conclude that the identified subscriber is a legitimate prospective recipient of the content. Further, as part of the validation process, the server may determine whether the referring subscriber has already referred the same content to the same other subscriber and, if so, may conclude that the other subscriber is not a legitimate prospective recipient.

If and only if the server determines that the referring subscriber has provided at least a required threshold number of legitimate referrals for the content, the server may then responsively transmit to the device an unlock key or other data that will enable the content. Alternatively, the server may transmit to the device a special code/identifier (e.g., randomly generated) that the DRM controller on the device may then programmatically send to a license server in order to download the requisite unlock key or other data. The DRM controller may then apply the unlock key or other data in order to enable the content, so that the subscriber may then enjoy the content.

Further, for each legitimate referral that the subscriber provides, the server or another server may automatically send a solicitation message to the referred subscriber, seeking to cause the referred subscriber to similarly acquire the content or the right to use the content. For instance, the server may send a solicitation message to the other subscriber by e-mail, SMS, MMS, or some other mechanism, prompting the other subscriber to acquire the content. Moreover, when the recipient referred subscriber seeks to responsively obtain the content, the inventive process can be repeated, to further distribute the content to still other subscribers.

In another embodiment, the invention can be carried out principally by one or more network servers when a subscriber seeks to acquire particular content or the right to use particular content. For instance, a subscriber may browse to an online content store and seek to acquire particular content. In response, a network server (e.g., a content server or authorization server) may require the subscriber to first provide a number of legitimate referrals as a condition to the subscriber acquiring the content, and the server (e.g., a content server or authorization server) may validate the referrals to ensure that at least a threshold number of the referrals are legitimate potential recipients of the content. If that validation is successful, the server may then transmit the content to the subscriber. Further, the server will preferably send a solicitation message to each referred subscriber.

The invention can advantageously be used to expand distribution of content among subscribers. In practice, a carrier, content provider, or other entity may provide content or use-rights free of charge to a subscriber who provides the requisite referral(s) and may, on the other hand, require a subscriber to pay a fee for the content if the subscriber does not provide the requisite referral(s). Alternatively, the carrier, content provider, or other entity may charge a reduced fee or credit back or otherwise award a subscriber for providing the requested referral(s).

In the exemplary embodiment, the invention can be implemented in a communication system that comprises a plurality of cellular wireless communication devices, each operated by a respective subscriber or more generally under a respective subscriber account. Preferably, each device will be programmed with a DRM controller that will function as described above. Further, the devices may be served by a given cellular carrier and may thus all be operable to engage in cellular wireless communication via one or more radio access networks (RANs) operated by the carrier, with each RAN in turn providing connectivity with a packet-switched network.

Residing as nodes on, or accessible via, the packet-switched network, may then be a content server, an authorization server, and a license server. These may be discrete servers, or they may be functionally combined together or distributed in various ways. For instance, a single server may function as a content server, authorization server, and license server. Preferably, the server(s) will include or have access to various data, such as content data defining premium digital content, including possibly multiple versions of each particular piece of content), referral data indicating what referrals have been provided in the past (e.g., who provided referrals of what content to whom), device capabilities data.

BRIEF DESCRIPTION OF THE DRAWINGS

Exemplary embodiments of the invention are described herein with reference to the drawings, in which.

DETAILED DESCRIPTION

I. System Overview

Figure 1:
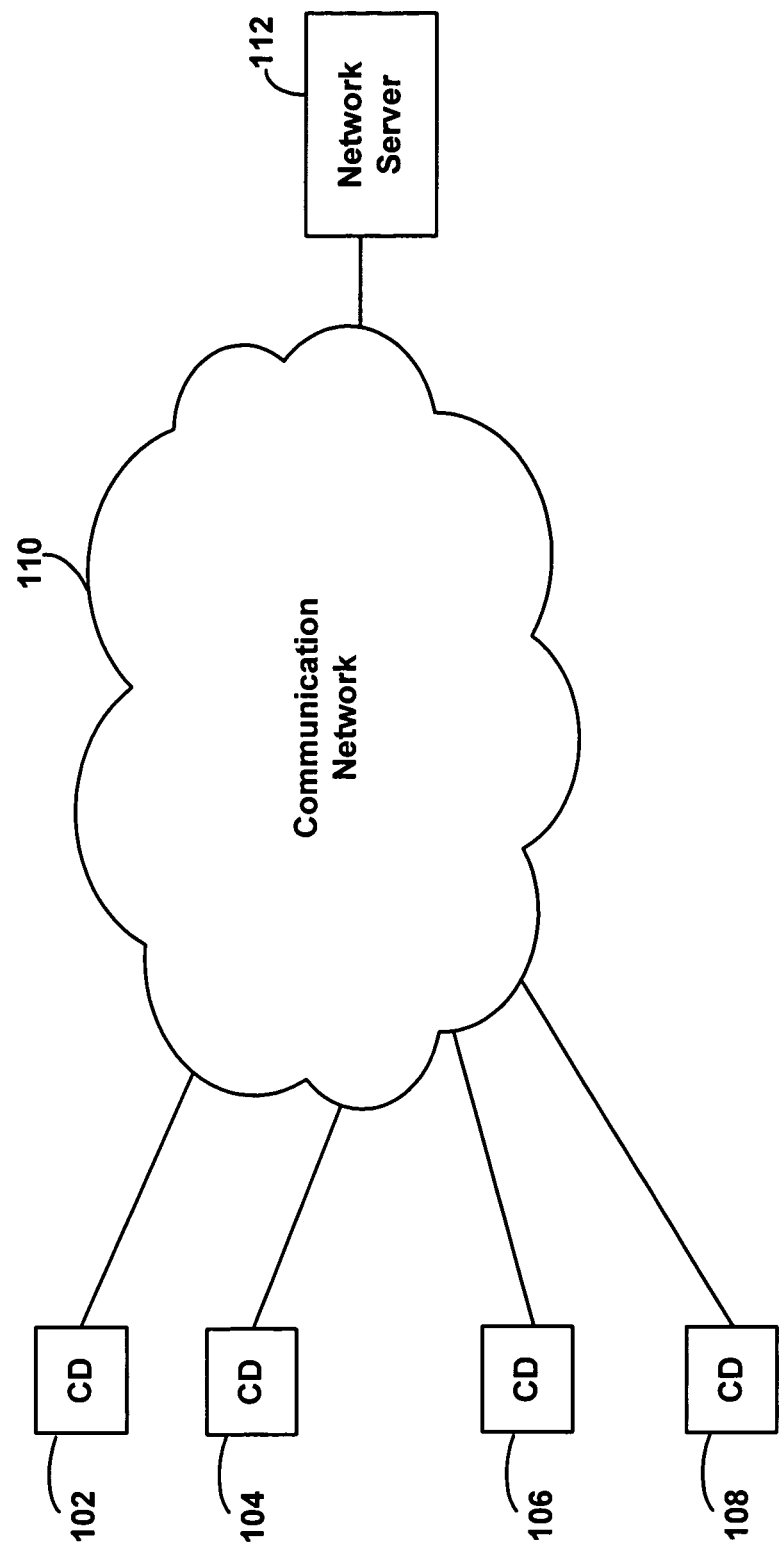
FIG. 1 is an exemplary arrangement for use in carrying out an exemplary embodiment of the present invention.

An exemplary embodiment of the present invention may be carried out in a system 100 as shown in FIG. 1. As illustrated, the system 100 comprises communication devices 102, 104, 106, and 108, a communication network 110, and a server 112.

It should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

Communication devices 102, 104, 106, and 108 may comprise a plurality of devices, each operated by a respective subscriber or more generally under a respective subscriber account. Further, the devices may be served by a given cellular carrier and may thus all be operable to engage in cellular wireless communication via one or more radio access networks (RANs) operated by the carrier, with each RAN in turn providing connectivity with a packet-switched network.

As an example, each of communication devices 102, 104, 106, and/or 108 may be arranged as a wireless communication device, such as cellular phone. A communication device arranged as a wireless communication device may carry out communications according to one or more air interface communication protocols, such as the Code Division Multiple Access (CDMA) protocol, the Global System for Mobile communication (GSM) protocol, and/or the Time Division Multiple Access (TDMA) protocol. Other examples of the one or more air interface communication protocols are also possible.

As another example, each of communication devices 102, 104, 106, and/or 108 may be arranged as a communication device that physically couples to the communication network 110. For instance, each of the communication devices may be arranged as a computer (e.g., a desktop computer, a notebook computer, or a programmable logic controller (PLC)) that physically couples to the communication network 110. Other examples of communication devices are also possible, and they may vary in form from each other.

Each of communication devices 102, 104, 106, and 108 may be capable of executing digital right management (DRM) control logic. DRM control logic may be implemented using software, for example. Alternatively, the DRM control logic may be implemented with hardware, or firmware, for example. Other examples implementing DRM control logic are also possible.

Each of communication devices 102, 104, 106, and 108 may be arranged to communicate with the server 112 as well. The communication devices may be arranged to transmit data to server 112 via communication network 110, and also receive data from the server 112 via communication network 110.

Figure 5:
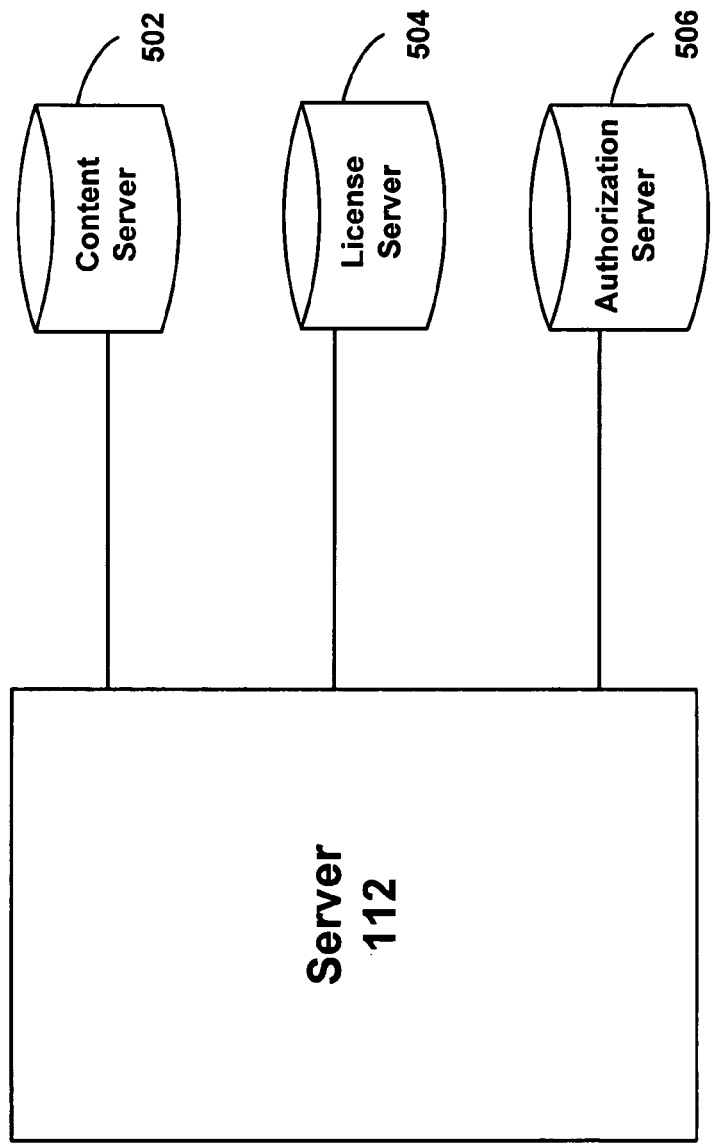
FIG. 5 is an exemplary server for use in carrying out an exemplary embodiment of the present invention.

The server 112 may be arranged in various configurations. As depicted in FIG. 5, server 112 may take the form of various servers. Further, server 112 may comprise discrete servers, one integrated server, or may otherwise be distributed in various ways.

For example, server 112 may take the form of content server 502, license server 504, and/or authorization server 506. Each server may perform their own functions. For instance, authorization server 506 may determine if at least a threshold number of the entered one or more referrals are valid, while content server 502 may transmit an unlock key, or other data to enable the content, after authorization server 506 determines that at least a threshold number of the entered one or more referrals are valid.

In addition, server 112 may be owned and operated by a carrier, content provider, or other entity that provides a grant of a content use right and/or and unlock key or other data that enables use of a content.

The server 112 may be arranged to communicate with communication devices 102, 104, 106, and 108 via communication network 110 in various ways. The server 112 may be arranged to transmit data to each of the communication devices 102, 104, 106, and 108 via communication network 110, and also receive data from each of the communication devices via communication network 110.

The communication network 110 provides means for performing unidirectional or bidirectional data communication between communication devices 102, 104, 106, and 108, and the server 112. One or more other devices may also communicate over at least a portion of the communication network 110.

The communication network 110 may include one network or a combination of two or more networks. For example, the communication network 110 may include a private network and/or a public network. A private network comprises a network established and operated by a private organization or corporation for users within that organization or corporation. An example of a private network is a Private Branch eXchange (PBX). A public network is a network designed for open, public access. An example of a public network is the Public Switched Telephone Network (PSTN).

As another example, the communication network 110 may include a circuit-switched network and/or a packet-switched network. A circuit-switched network is a network in which a continuous link is established between a data-sending device (e.g., the server 112) and a data-receiving device (e.g., communication devices 102, 104, 106, and 108) for the duration of a communication session. An example of a circuit-switched network is the PSTN. A packet-switched network is a network in which packets (e.g., messages or fragments of messages) are individually routed between devices on the packet-switched network, with no previously established communication path. An example of a packet-switched network is the Internet.

As yet another example, the communication network 106 may comprise a Local Area Network (LAN), a Metropolitan Area Network (MAN), and/or a Wide Area Network (WAN).

Figure 2:
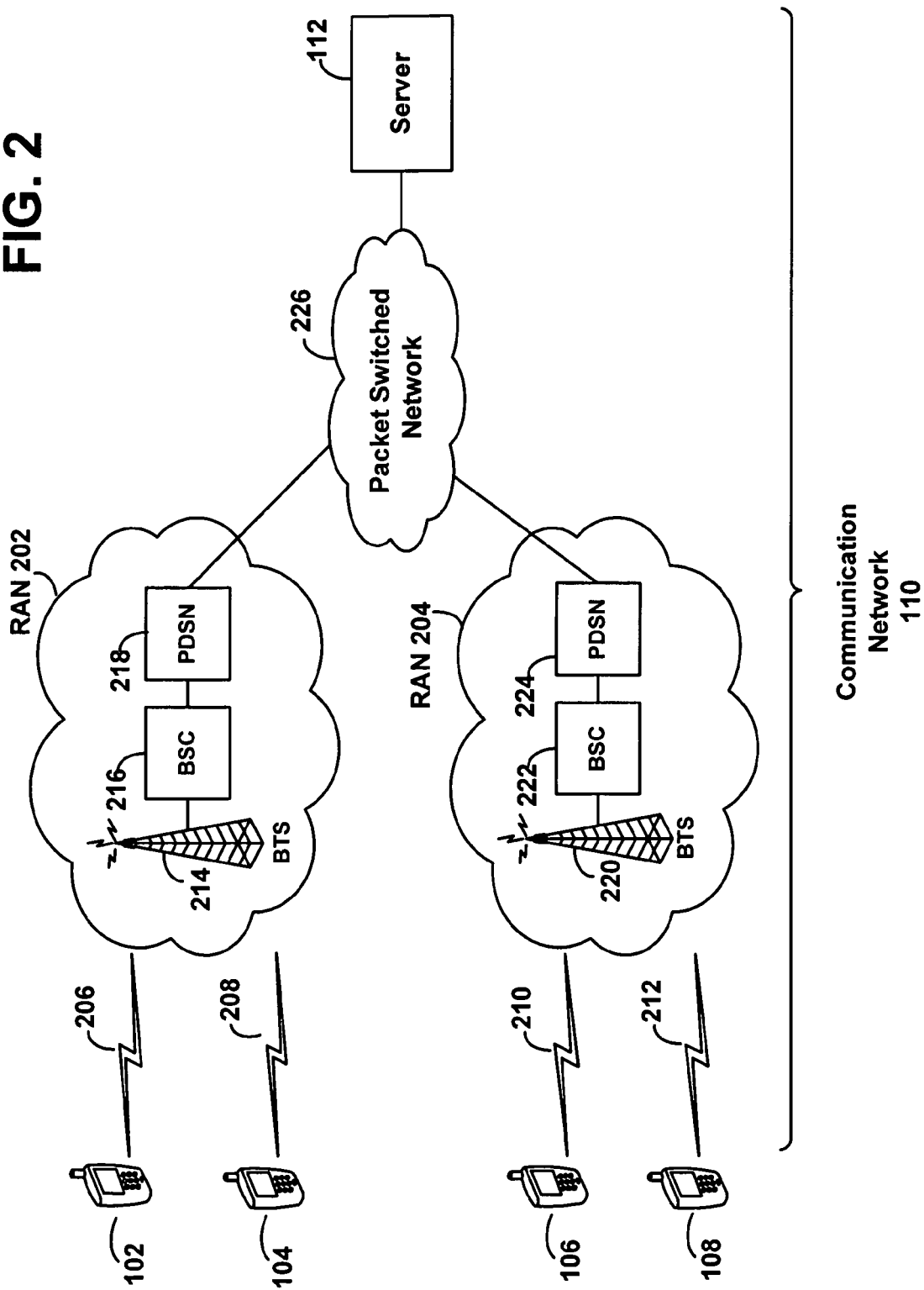
FIG. 2 is an exemplary arrangement for use in carrying out an exemplary embodiment of the present invention.

As still yet another example, in accordance with the example of the communication devices 102, 104, 106, and 108 comprising wireless communication devices, communication network 110 may be arranged as the communication network 200 shown in FIG. 2. As shown in the figure, the communication network 200 comprises a Radio Access Network (RAN) 202, a RAN 204, and a packet-switched network 226.

The RAN 202 comprises a radio frequency (RF) air interfaces 206 and 208, which are coupled to communication devices 102 and 104, respectively. RAN 202 also comprises a Base Transceiver Station (BTS) 214 and a Base Station Controller (BSC) 216 coupled to the BTS 214. The RAN 202 may comprise one or more other BTSs as well. The BTS 214 forms a corresponding cell by radiating signals away from the BTS 214. The signals radiated away from the BTS 214 form the RF air interfaces 206 and 208 and may be arranged according to the CDMA air interface protocol or some other air interface protocol.

The BSC 216 performs many functions. For example, the BSC 216 manages the use of the BTS 214. The BSC 216 also controls the handoff of a wireless communication device from the BTS 214 to another BTS as the wireless communication device moves from one cell to another cell.

The BSC 216 provides a connection interface to a gateway, such as a Packet Data Serving Node (PDSN) 218. The PDSN 218 provides an interface between the BSC 216 and the packet-switched network 226. The PDSN 218 facilitates establishing, maintaining, and terminating point-to-point protocol (PPP) links for communication devices 102 and 104. The communication devices 102 and 104 may establish a PPP link with the PDSN 218.

Server 112 may reside as a node on, or be accessible via, a packet-switched network 226, for example. Thus, server 112 may be a network entity on communication network 110. After establishing a PPP link with the PDSN 218, the communication devices 102 and 104 may communicate with the server 112 via the packet-switched network 226.

Similarly, RAN 204 comprises RF air interfaces 210 and 212, which are coupled to communication devices 106 and 108, respectively. RAN 204 also comprises a BTS 220, and a BSC 222 coupled to the BTS 220. The PDSN 224 provides an interface between the BSC 222 and the packet-switched network 226. The communication devices 106 and 108 may establish a PPP link with the PDSN 224. After establishing a PPP link, the communication devices 106 and 108 may communicate with the server 112 via the packet-switched network 226.

Alternatively, a mobile switching center (MSC) (not shown) may be used to provide a means for connecting the RAN 204 to a PSTN (not shown). The PSTN may be coupled to a modem that, in turn, is coupled to the server 112. The MSC can provide connection to one or more trunk lines of the PSTN for establishing a path through the PSTN for use in carrying out data communication between the communication devices 106 and 108 and server 112.

II. Exemplary Communication Device

Figure 3:
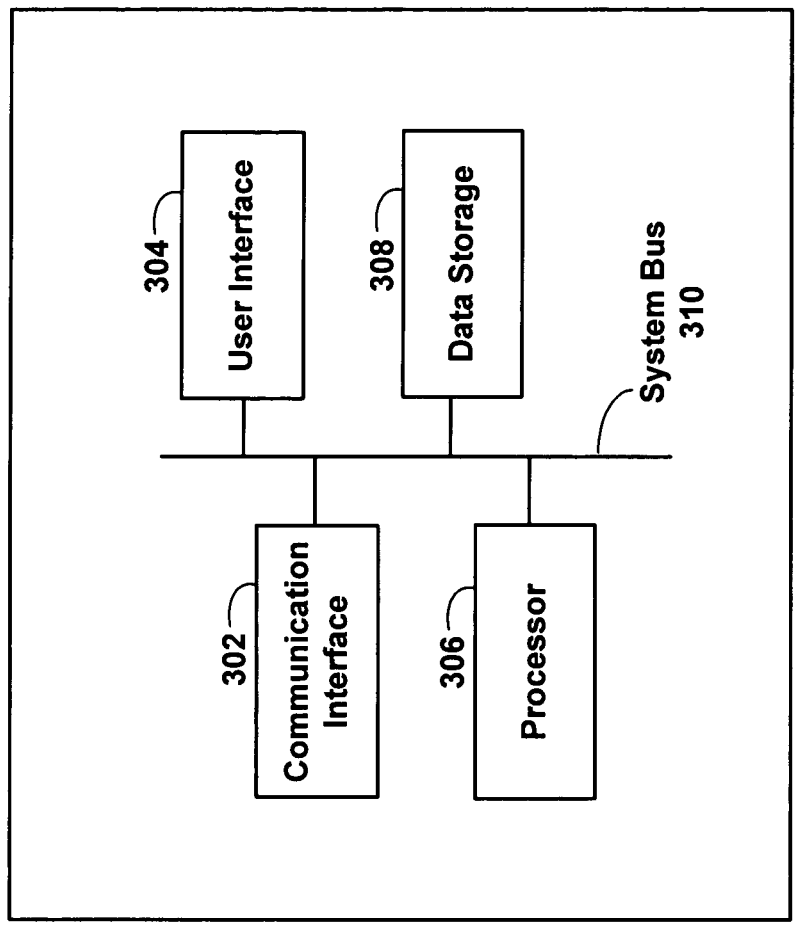
FIG. 3 is a block diagram of an exemplary communication device for use in carrying out an exemplary embodiment of the present invention.

Communication devices 102, 104, 106, and 108 may be arranged in any of a variety of configurations. FIG. 3 is a block diagram of an exemplary communication device 300 for use in carrying out an exemplary embodiment of the present invention. As shown in FIG. 3, communication device 300 comprises a communication interface 302, user interface 304, processor 306, and data storage 308, all linked together via a system bus, network, or other connection mechanism 310.

Communication interface 302 provides an interface between communication network 110 and communication device 300. Communication interface 302 provides means to perform communications over communication network 110, and in turn, communications with the server 112. Communication device 300 may also communicate with other network entities that are not shown in FIG. 1 or FIG. 2.

The communication interface 302 may be arranged in various configurations. In the example where a communication device 300 is arranged as a wireless communication device, the communication interface 302 may be arranged as an interface that includes a chipset and an antenna for interfacing with a RAN. An exemplary chipset that facilitates air interface communication according to the CDMA protocol is the MSM6000™ chipset manufactured by Qualcomm Incorporated of San Diego, Calif.

In the example where a communication device is arranged as a desktop computer, notebook computer, or PLC, the communication interface 302 may be arranged as an interface that includes an Ethernet Network Interface Card (NIC). The NIC could be a NIC that is physically coupled to the communication network 110 or could be a wireless NIC that communicates with the communication network 110 via as the IEEE 802.11 air interface standards established by the Institute of Electrical and Electronics Engineers (IEEE), Inc. Other examples of configurations of the communication interface 302 are also possible.

The user interface 304 may provide various means for a subscriber (or user, more generally) to interact with communication device 300. Interacting with communication device 300 may include arranging communication device 300 into any of a variety of configurations that may allow a subscriber to transmit data into and receive data from communication device 300.

User interface 304 may be arranged to provide a means to present data to the subscriber. User interface may comprise one or more displays, for example. User interface 304 may be arranged as a graphical user interface (GUI), for instance. In this regard, user interface 304 may include a display, such as a liquid crystal display or a cathode ray tube display, for displaying the GUI. Additionally, user interface 304 may comprise one or more loud speakers, for example.

User interface 304 may be arranged to provide a means to enter data into communication device 300. User interface 304 may be arranged as a microphone. A user operating communication device 300 may utter sounds detectable by a microphone. A microphone and associated circuitry detecting the uttered sounds may convert the detected sounds to data storable at the data storage 308.

User interface 304 may also be arranged as a keypad. A user may enter data that comprises numbers and letters into communication device 300 via a keypad. Other examples of user interface 304 are also possible.

Processor 306 may comprise one or more processors (e.g., one or more general purpose processors and/or one or more specialized (e.g., dedicated) processors). Processor 306 is arranged to carry out functions described herein, and may do so by executing computer-readable program instructions stored in data storage 308 and/or in firmware. In response to executing the program instructions, processor 302 may interact with communication interface 302, user interface 304, and/or connection mechanism 310 so as to carry out functions described herein.

The data storage 308 may store various types of data and may comprise a computer readable medium. The computer-readable medium may comprise volatile and/or non-volatile storage components, such as optical, magnetic, organic or other memory or disc storage. The computer-readable medium of the data storage 304 may be integrated in whole or in part with the processor 302.

Data storable on data storage 308 may be arranged as DRM control logic. The DRM control logic may be implemented through program instructions executable by processor 306. As an example, program instructions executable by processor 306 may include: (i) instructions to prompt a subscriber to enter one or more referrals in response to a subscriber request to use digital content that is locked on the device, an attempt to use digital content on the device that is locked, and/or a request for a content-use right, (ii) instructions to transmit an indication of the entered one or more referrals to communication network 110, and in turn, to the server 112, (iii) instructions to receive an unlock key, a license key, a grant of a content-use right, or other data to facilitate or enable use of the content from the server 112 via communication network 110, and/or (iv) instructions to enable the content by applying the received unlock key, license key, grant of a content-use right, or other data to facilitate or enable use of the content. Other examples of program instructions stored on data storage 308 executable by processor 306 are also possible.

Data storage 308 may comprise referenced data as well. The data may comprise content that a subscriber wishes to use. The content may comprise music, videos, user interfaces, and/or application logic, for example. Other examples of content are also possible. The data stored on data storage 308 may also comprise an unlock key, a license key, a grant of a content-use right, or other data to facilitate or enable use of the content. Other examples of data stored on data storage 308 are also possible.

III. An Exemplary Server

Figure 4:
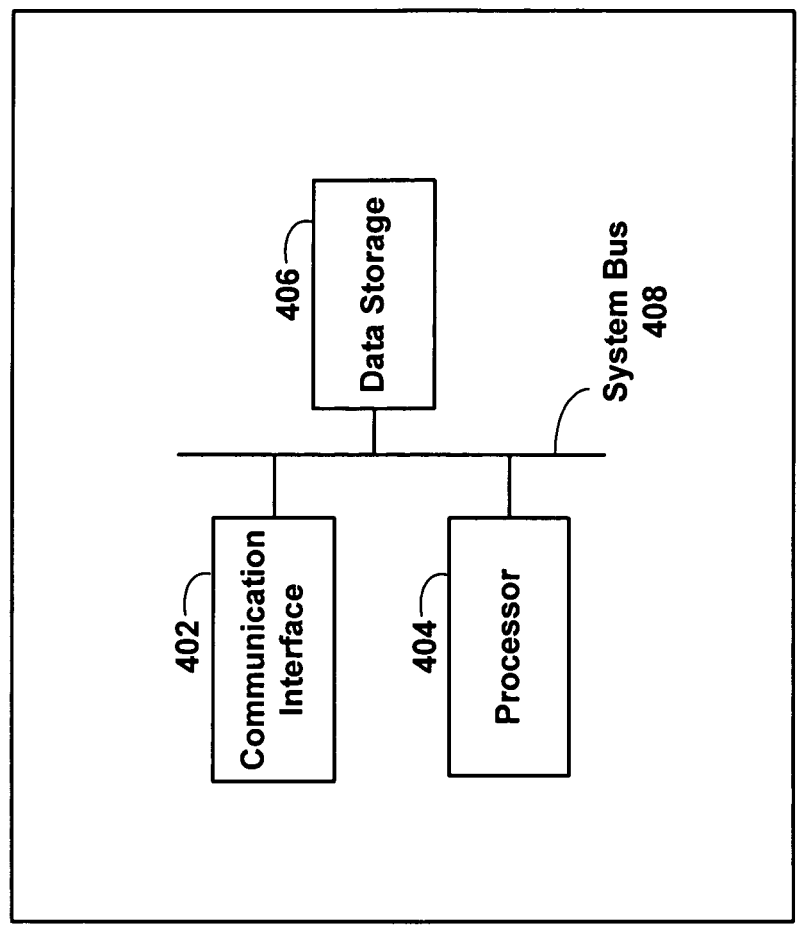
FIG. 4 is a block diagram of an exemplary server for use in carrying out an exemplary embodiment of the present invention.

FIG. 4 is a block diagram of an exemplary server 400 for use in carrying out an exemplary embodiment of the present invention. Server 400 may be arranged as an integrated server, and may carry out the functions of various discrete servers. Server 400 includes a communication interface 402, processor 404, and data storage 406, all linked together via a system bus, network, or other connection mechanism 408.

Communication interface 402 provides an interface between communication network 110 and other portions of server 400. Communication interface 402 provides means to perform communications over communication network 110, and in turn, communications with communication device 300. Server 400 may also communicate with other network entities that are not shown in FIG. 1 or FIG. 2.

Processor 404 may comprise one or more processors (e.g., one or more general purpose processors and/or one or more specialized (e.g., dedicated) processors). Processor 404 is arranged to carry out functions described herein, and may do so by executing computer-readable program instructions stored in data storage 406 and/or in firmware. In response to executing the program instructions, processor 404 may interact with communication interface 402, and/or connection mechanism 408 so as to carry out functions described herein.

The data storage 406 may store various types of data. Data storable in data storage may comprise a computer readable medium. The computer-readable medium may comprise volatile and/or non-volatile storage components, such as optical, magnetic, organic or other memory or disc storage. The computer-readable medium of the data storage 404 may be integrated in whole or in part with the processor 404.

Data storable on data storage 406 may be arranged as program instructions executable by processor 404. Further, the program instructions stored on data storage 406 may define various server functions. As an example, program instructions executable by processor 404 may include: (i) instructions to receive a request for a content-use right, (ii) instructions to prompt a subscriber to enter one or more referrals, (iii) instructions to receive an indication of one or more entered referrals, (iv) instructions to determine whether a threshold number of the referrals are valid, (v) instructions to send a rejection message if a threshold number of valid referrals were not provided by the subscriber of a device, (vi) instructions to transmit an unlock key, license key, grant of a content-use right, or other data to facilitate or enable use of the content, (vii) instructions to transmit a solicitation message to the one or more referrals, and/or (viii) instructions to provide an award for the entered referrals.

Data storage 406 may comprise referenced data as well. The data may take various forms. For example, the data may comprise unlock keys, license keys, special codes and/or identifiers, and other data to enable content. Further, the data may comprise content data defining premium digital content, including possibly multiple versions of each particular piece of content.

Additionally, the data may take the form of device capabilities data, and/or data to determine whether a referred subscriber device is a legitimate prospective recipient of the content. The data may indicate whether an identified subscriber device has program logic and user-interface components to allow for playout or other use of the content, and may also indicate whether a version of the content that is compatible with the device's capabilities is available for delivery to the device.

The data may also take the form of referral data indicating what referrals have been provided in the past (e.g., who provided referrals of what content to whom). The data may indicate whether the referring subscriber has already referred the same content to the same other subscriber. Other examples of reference data stored on data storage 406 are also possible.

IV. Flowchart of an Exemplary Embodiment

Figure 6:
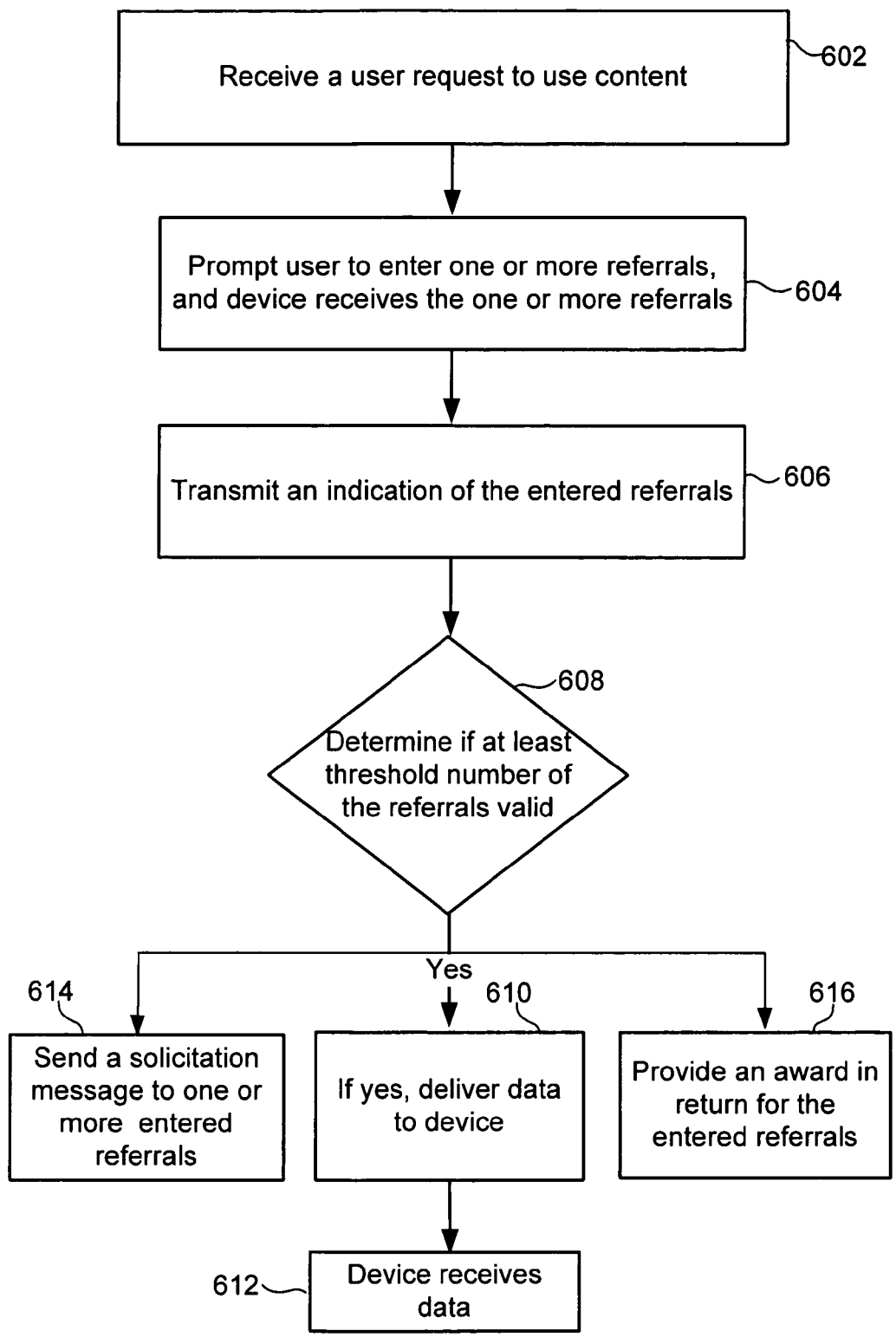
FIG. 6 is an exemplary flowchart provided to illustrate some of the functions that may be carried out in accordance with an exemplary embodiment.

FIG. 6 is an exemplary flowchart provided to illustrate some of the functions that may be carried out in accordance with an exemplary embodiment.

As an example, the communication device 300 may be arranged as the communication device 102 shown in FIG. 2. Further, server 400 may be arranged as the server 112 shown in FIG. 2, which may be a network entity on communication network 110.

As depicted in FIG. 6, a user operating communication device 300 either attempts to use digital content on the device that is locked, or requests to use digital content on the device that is locked (e.g., requests an unlock key, license key, or other data to enable the content). The device responsively prompts the user to enter one or more referrals, and the user then enters one or more referrals into the device. The device then transmits an indication of the entered referrals to server 400. Server 400 then makes a determination as to whether at least a threshold number of the entered referrals are valid, and if so, transmits to communication device 300 data that facilitates use of the digital content (such as an unlock key, license key, or other data to enable the content). In addition, server 400 may transmit a solicitation message to each of at least the threshold number of entered referrals, and may also provide an award to the user of communication device 300 in return for the entered referrals.

A. Receive a User Request to Use Content

A user operating communication device 300 requests to use digital content, where at least a portion of the digital content resides on the device at the time the user requests to use the digital content. However, the digital content is not enabled (e.g., locked), and in order to use the content, the communication device 300 requires an unlock key, license key, a further portion of the digital content, or other data to enable the content. At block 602, a user either enters a request into the device to use digital content on the device that is locked, or attempts to unlock digital content on the device. In one embodiment, a user requests to unlock the digital content, or attempts to use digital content that is locked via user interface 304.

B. Prompt User to Enter One or More Referrals, and Receives the One or More Referrals In response to the user request to use or attempt to unlock the digital content, at block 604, communication device 300 prompts the user to enter one or more referrals. In one embodiment, the device is programmed with a DRM controller, and pursuant to the DRM controller, processor 308 programmatically presents the prompt-display to the user via user interface 304. The prompt-display may, for example, request the user to enter the one or more referrals.

The user then enters the one or more referrals into communication device 300, via user interface 304. The user may enter the one or more referrals in the form of respective mobile directory numbers (MDN). Other forms of a user entering referrals into the device are also possible.

C. Transmit an Indication of the Entered Referrals

At block 606, the communication device 300 transmits an indication of the entered referrals to server 400. The indication of the entered referrals may be transmitted in a hypertext transfer protocol (HTTP) message containing the indication of the entered referrals. Other examples of transmitting the indication of the entered referrals are also possible.

Thus, pursuant to the DRM control logic, processor 306 transmits an indication of the entered referrals via communication interface 302 to server 400.

For instance, if the communication device 300 comprises a wireless communication device, the processor may transmit the indication of the entered referrals wirelessly to base station 214 for transmission in turn to server 400 through communication network 110.

D. Are at Least the Threshold Number of the Entered Referrals Valid?

Next, at block 608, server 400 determines whether at least a threshold number of the entered referrals are valid. To make this determination, server 400 determines whether each entered referral, up to at least a threshold number of referrals, is valid. A referral may be determined to be valid if, for example, the entered referred device is capable of using the digital content. If server 400 determines that at least a threshold number of the entered referrals each designate a device that is capable of using the digital content, server 400 may conclude that at least the threshold number of entered referrals are valid.

In one embodiment, for each referred device, up to at least the threshold number, processor 404 of server 400 queries capabilities data from data storage 406 to determine whether the device is capable of using the same digital content that the user is attempting to access/use. For example, the processor may determined whether the device has program logic and user-interface components to allow for playout or other use of the content. Further, the programming instructions may comprise determining whether a version of the content that is compatible with the device's capabilities is available for delivery to the device. If either of these conditions are met, or if both conditions are met, for example, the processor may programmatically conclude that the device is capable of using the digital content, and is therefore, a legitimate prospective recipient of the content.

E. Deliver Data to Device if at Least Threshold Number of Referrals Valid

At block 610, if server 400 determines that the one or more entered referrals includes at least the threshold number of valid referrals, then server 400 will respond with data that facilitates use of the content. The data may comprise, for example, an unlock key, a license key (e.g., special code or identifier), or other data to enable the content. In one embodiment, processor 402 of server 400 transmits the data via communication interface 402.

However, if server 400 determines that the one or more entered referrals does not include at least the threshold number of valid referrals, then server 400 transmits a rejection of the request for the unlock key, license key, or other data to enable the content (or data to facilitate use of the content, more generally). The rejection message may comprise, for example, an identification of which referrals were valid, and which referrals were not valid. In addition, server 400 may require the user of communication device 300 to pay a fee for the unlock key, license key, or other data to enable the content. In one embodiment, processor 404 executes programming instructions to send, via communication interface 402, a rejection of the request for the data to the communication device 300.

F. Device Receives Data

At block 612, communication device 300 receives the data that facilitates use of the digital content. The data may comprise, for example, an unlock key, a license key, or other data to enable the content. In one embodiment, communication device 300 comprises a wireless communication device, and the device receives the data wirelessly from communication network 110 (specifically from base station 214 of communication network 110), via communication interface 302.

Upon receipt of the data, pursuant to the DRM control logic, processor 306 may execute programming instructions to apply the unlock key, license key, or other data to enable the content.

G. Send a Solicitation Message to One or More Entered Referrals

At block 614, server 400 sends a solicitation message to each of at least the threshold number of entered referrals. The solicitation message to each entered referral device may comprise a solicitation for further acquisition of the digital content, which may further comprise a prompt directing the user of the referred device to similarly acquire the content or the right to use the content. In one embodiment, processor 402 of server 400 executes programming instructions to send a solicitation message to each of at least the threshold number of entered referral devices.

The solicitation message may comprise, for example, an e-mail, a short messaging server (SMS) alert (e.g., a WAP Push message, which provides a link to the digital content), or some other mechanism. Other examples of sending the solicitation message are also possible.

H. Provide an Award in Return for the Entered Referrals

At block 616, server 400 may provide an award to the user of communication device 300 in return for the entered referrals. The award may comprise, for example, providing the user with the unlock key, license key, or other data to enable the content, free of charge. The award may also comprise the subscriber being charged a reduced fee for the data. Additionally, the award may comprise the subscriber's account being credited back. Other examples of awarding the subscriber are also possible.

In one embodiment, processor 404 of server 400 executes programming instructions to provide an award to the user of communication device 300.

V. Flowchart of an Alternative Embodiment

Figure 7:
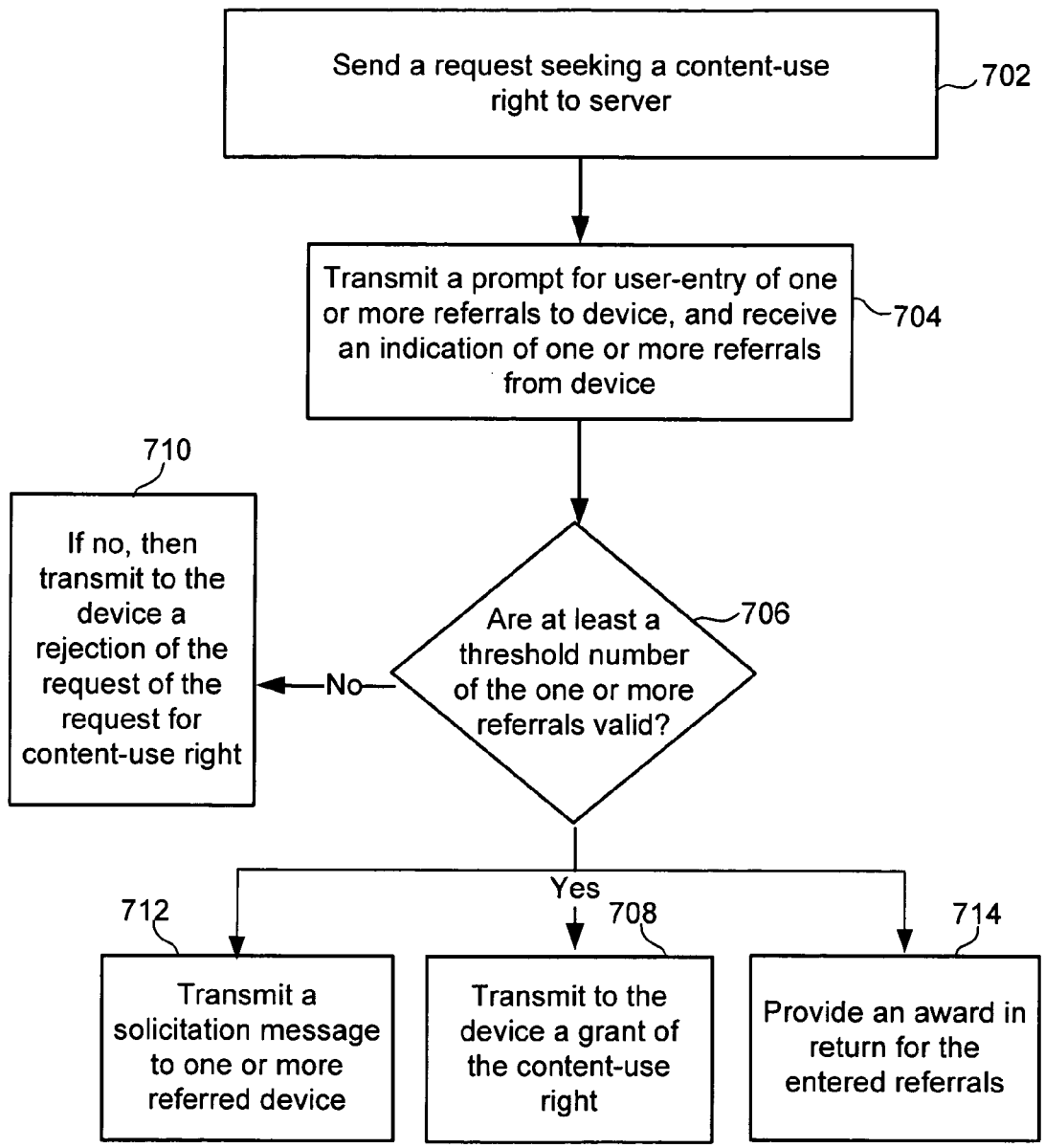
FIG. 7 is an exemplary flowchart provided to illustrate some of the functions that may be carried out in accordance with an alternative embodiment.

FIG. 7 is an exemplary flowchart provided to illustrate some of the functions that may be carried out in accordance with an alternative embodiment.

As an example, the communication device 300 may be arranged as the communication device 102 shown in FIG. 2. Further, server 400 may be arranged as the server 112 shown in FIG. 2, which may be a network entity on communication network 110.

As depicted in FIG. 7, a user operating communication device 300 directs device 300 to send to server 400 a request seeking a content-use right. Server 400 responsively transmits to the device a prompt for user-entry of one or more referrals, and then receives from the device an indication of the one or more referrals entered by the user. Server 400 then makes a determination as to whether the one or more entered referrals includes at least a threshold number of valid referrals. If so, server 400 will transmit to the device a grant of the content-use right. However, if server 400 determines that the one or more entered referrals does not include at least the threshold number of valid referrals, then the server will transmit to the device a rejection of the request for content-use right. Furthermore, in response to receiving the indication of one or more referrals, server 400 may transmit a solicitation message respectively to each other referred communication device. The server may also provide an award to the user of communication device 300 in return for the entered referrals.

A. Send a Request Seeking a Content-Use Right to Server

At block 702, a user operating communication device 300 sends a request seeking a content-use right. For instance, a user may browse an online content store and seek to acquire particular content. A request seeking a content-use right may comprise a request to obtain particular digital content (including a right to use the particular digital content), and/or a request for data to facilitate use of particular digital content, for example.

In one embodiment, a user enters a request seeking a content-use right into communication device 300 via user interface 304. Pursuant to DRM control logic, processor 302 may then send, via communication interface 302, the request for a content-use right to server 400.

B. Transmit a Prompt for User-Entry of One or More Referrals to Device, and Receive an Indication of One or More Referrals from Device Next, at block 704, in response to the user request for a content-use right, server 400 transmits to the device a prompt for user-entry of one or more referrals. In one embodiment, processor 404 of server 400 transmits, via communication interface 402, a prompt for user-entry of one or more referrals to communication device 300.

In response to receiving the prompt, the user of the device will enter one or more referrals into the device, and will subsequently transmit an indication of the one or more referrals to server 400. In one embodiment, the user of communication device 300 will receive the prompt, and enter the one or more referrals into the device via user interface 304. Pursuant to DRM control logic, processor 302 may transmit, via communication interface 302, the indication of the one or more referrals to server 400.

C. Are at Least a Threshold Number of the One or More Referrals Valid?

Next, at block 606, server 400 determines whether at least a threshold number of the entered referrals are valid. To make this determination, server 400 determines whether each entered referral, up to at least a threshold number of referrals, is valid. A referral is determined to be valid if, for example, the entered referral device is capable of using the digital content. If server 400 determines that at least a threshold number of the entered referrals each designate a device that is capable of using the digital content, server 400 may conclude that at least the threshold number of entered referrals are valid.

In one embodiment, for each identified subscriber device, up to at least the threshold number, processor 404 of server 400 executes programming instructions to query capabilities data from data storage 406 to determine whether a referral device is capable of using the digital content. For example, the processor may determine whether the referral device has program logic and user-interface components to allow for playout or other use of the content. Further, the processor may determine whether a version of the content that is compatible with the device's capabilities is available for delivery to the entered referral device. If either condition is met, or if both conditions are met, for example, the processor may conclude that the identified subscriber device is capable of using the digital content, and is therefore, a legitimate prospective recipient of the content.

D. If Yes, Transmit to the Device a Grant of the Content-Use Right

At block 608, if server 400 determines that the one or more entered referrals includes at least the threshold number of valid referrals, then server 400 will transmit the requested content and/or data that facilitates use of the content. The data may comprise, for example, a grant of the content-use right, a license key (e.g., special code or identifier), or other data to enable the content. In one embodiment, processor 402 of server 400 may execute programming instructions to transmit, via communication interface 402, the data to communication device 300.

E. If no, then transmitting to the device a rejection of the request for content-use right.

At block 610, if server 400 determines that the one or more entered referrals does not include at least the threshold number of valid referrals, then a rejection of the request for content-use right may be transmitted. The rejection message may comprise, for example, an identification of which referrals were legitimate, and which referrals were not legitimate. In addition, the subscriber may be required to pay a fee for the content, the content-use right, and/or the data that facilitates use of the content.

In one embodiment, processor 404 executes programming instructions to send, via communication interface 402, a rejection of the request for the data to the communication device 300. The programming instructions may also comprise requiring the user to pay a fee for the unlock key, license key, or other data to enable use of the content.

F. Transmit a Solicitation Message to One or More Referred Devices

At block 612, server 400 sends a solicitation message to each of other subscriber communication device. The solicitation message to each entered referral device may comprise a solicitation for further acquisition of the digital content, which may further comprise a prompt directing the user of the referred device to similarly acquire the content or the right to use the content. In one embodiment, processor 402 of server 400 executes programming instructions to send a solicitation message to each other subscriber communication device.

The solicitation message may comprise, for example, an e-mail, a short messaging server (SMS) alert (e.g., a WAP Push message, which provides a link to the digital content), or some other mechanism. Other examples of sending the solicitation message are also possible.

G. Provide an Award in Return for the Entered Referrals

At block 614, server 400 may provide an award to the user of communication device 300 in return for the entered referrals. In one embodiment, processor 404 of server 400 executes programming instructions to provide an award to the user of communication device 300.

The award may comprise, for example, providing the user with the grant of a content-use right free of charge. The award may also comprise the subscriber being charged a reduced fee for the grant. Additionally, the award may comprise the subscriber's account being credited back. Other examples of awarding the subscriber are also possible.

VII. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method comprising:

receiving into a network, from a subscriber communication device, a request seeking a content-use right;

transmitting to the subscriber communication device a prompt for user-entry of one or more referrals, and then receiving from the subscriber communication device an indication of one or more referrals entered by a user into the subscriber communication device in response to the prompt;

in the network, a server making a determination of whether the one or more entered referrals includes at least a threshold number of valid referrals;

if the determination is that one or more entered referrals includes at least the threshold number of valid referrals, then transmitting to the device a grant of the content-use right; and if the determination is that the one or more entered referrals does not include at least the threshold number of valid referrals, then transmitting to the device a rejection of the request for content-use right, wherein the content-use right is a use-right for digital content, and wherein making the determination of whether the one or more entered referrals includes at least the threshold number of valid referrals comprises (i) for each of the entered referrals, up to at least the threshold number, making a decision, based on capabilities data, of whether the referral designates a device that is capable of using the digital content, and (ii) concluding that the one or more entered referrals includes at least the threshold number of valid referrals if the decision is that at least the threshold number of entered referrals each designates a device that is capable of using the digital content.

2. The method of claim 1, wherein the request seeking the content-use right comprises a request to obtain particular digital content, including a right to use the particular digital content.

3. The method of claim 1, wherein the request seeking the content-use right comprises a request for data to facilitate use of particular digital content.

4. The method of claim 1, wherein each entered referral indicates another subscriber communication device, the method further comprising:

in response to receiving the indication of one or more referrals, transmitting a solicitation message respectively to each other subscriber communication device.

5. The method of claim 4, wherein transmitting the solicitation message comprises sending the solicitation message as a short messaging service (SMS) alert, providing a link to the digital content.

6. The method of claim 1, further comprising:
providing an award in return for the entered referrals.

* * * * *